June 5, 1928.  1,672,013

G. B. VROOM

PACKING

Filed June 25, 1925

Section at A-A.

Inventor
G. B. Vroom.
By
Attorney

Patented June 5, 1928.

1,672,013

UNITED STATES PATENT OFFICE.

GUYSBERT B. VROOM, OF WASHINGTON, DISTRICT OF COLUMBIA.

PACKING.

Application filed June 25, 1925. Serial No. 39,625.

This invention relates to improvements in packing and more particularly to packing for rotating shafts extending outwardly from high pressure containers or the like.

One of the objects of the present invention is to provide a simple and practical packing of the above general character which may be inexpensively manufactured and assembled.

A further object is to provide a packing of the above character in which the various wearing and renewable parts may be die-stamped rather than machined.

A further object is to provide a packing particularly adapted for a rotating shaft in which the friction is reduced to a minimum.

A further object is to provide a packing having great adjustability and flexibility and in which the parts may be easily and quickly renewed, if necessary, without dismantling the machine.

Other objects will be in part obvious and in part hereinafter pointed out in connection with the accompanying sheet of drawings illustrating one of various possible embodiments of the invention and wherein similar reference characters denote corresponding parts.

In this drawing.

Figure 1:
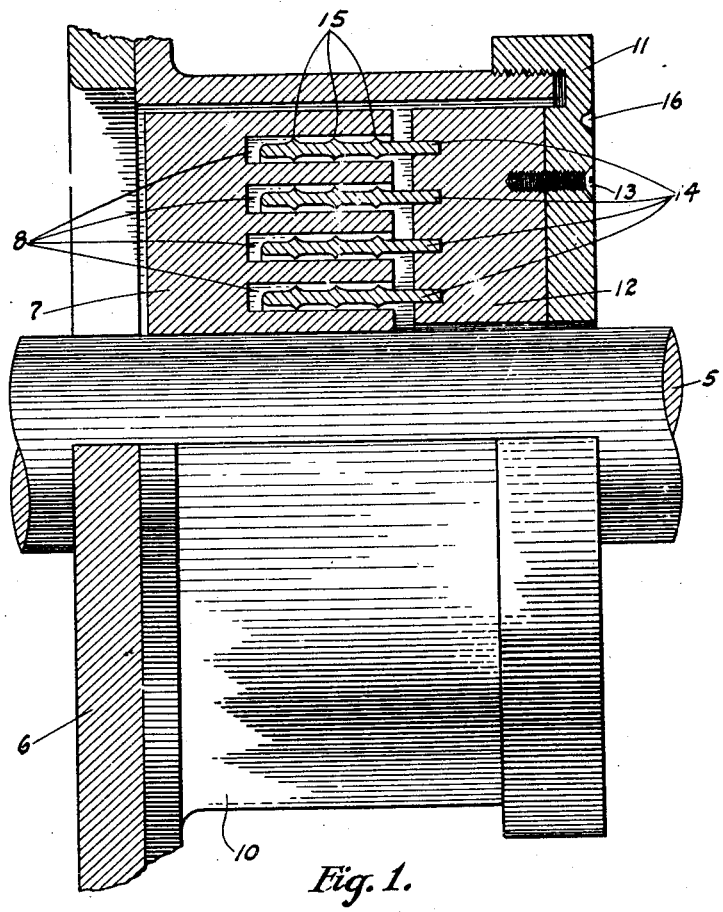
Figure 1 is a partial elevation and sectional view showing such parts as are necessary to fully understand the invention.

Referring now to the drawings in detail, 5 indicates a shaft about which the packing is assembled. As herein shown and described, this is a rotating shaft such as is used in turbine construction and the packing is for the purpose of preventing excessive steam leakage.

Figure 3:
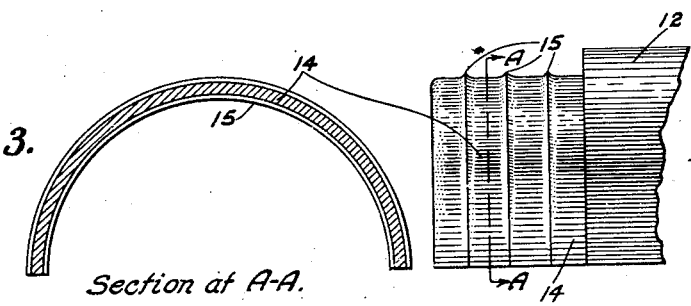
Figure 3 is a detail sectional view of the same taken substantially on the line A—A, Figure 2.
Figure 2:
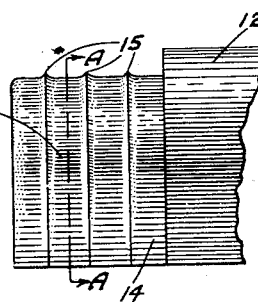
Figure 2 is a detail elevational view of a part.

The shaft passes through the wall 6 of the turbine casing and has secured thereto in any desired fixed relation an annulus or member 7 provided with a series of concentric grooves 8, being steam tight and keyed or otherwise secured to the shaft. This member 7 is free to rotate within annular casing 10 which is tightly secured to the wall 6 in any desired manner. The outer end of the casing 10 is threaded to receive a cover plate 11, which cover plate covers an annular block 12 secured thereto by one or more screws 13 as shown. This annular block 12 is provided with a series of circular recesses into which packing rings or sleeves 14, Figure 2, are securely driven. The rings 14 as shown in detail in Figures 2 and 3 are provided with a series of ridges 15 which make a small clearance with the grooves 8. These rings 14 are preferably made in half sections as shown in Figure 3. They are preferably die-stamped for ease of manufacture and to avoid expensive machining.

It will thus be seen that when the parts are in assembled relation, the rings 14 together with their ridges interfitting in the recesses 8 provide a labyrinth effect and by fitting into the recesses just deep enough to avoid tip contact with the bottom of the grooves 8 causes leakage of steam to be "wire drawn" a plurality of times; that is to say, the pressure of the steam is progressively reduced until a normal leak-off is obtained about the shaft 5. By use of a spanner wrench in the diametrically opposite recesses 16, the cover plate 11 may be moved in and out as desired to adjust the clearance between the tip of the rings 14 and the bottoms of the recesses 8.

It will thus be seen that the present packing is of the labyrinth type which permits cheap and accurate manufacturing, ease of renewal, adjustability of clearance without the necessity of adjusting the shaft and interior reduction of weights and sizes and particular adaptability to existing designs of turbines.

It will of course be understood that while only four annular rings, each with three ridges is herein shown and described is applied to a rotating shaft, the number of these rings and the ridges thereof may be varied according to circumstances and the pressures to be considered. Also by making the rings in half sections, when it is necessary to renew any of the parts, the cover 11 can be backed off the casing 10, and the semi-circular rings 14, removed and replaced thereby eliminating prolonged tie-ups as occurs with the present existing type of packing, or expensive disassembly of the machine. It may be adjusted without the necessity of adjusting the shaft, a difficulty ordinarily encountered, which causes a change in the clearances between the rotor and stator blading.

What I claim is:—

1. In a packing of the character described, a shaft, an annulus fixed therein having a plurality of concentric grooves in one face thereof, a casing about the annulus, a plurality of packing members adapted to extend within said grooves, each packing member having its outer and inner surfaces provided with ridges to form a labyrinth packing with the side walls of said grooves, and a closure for said casing adapted to removably support the packing members, said packing members and closure constituting a unit assembly freely adjustable with respect to the annulus.

2. In combination, a shaft, an annulus fixed upon the shaft having a plurality of spaced concentric grooves in its outer face, a casing about the annulus and extending outwardly therefrom, a supporting member carried by the outer end of the casing freely adjustable with respect to the annulus, and annular packing members removably supported by the supporting member, said packing members being provided with ridges upon the surfaces thereof and adapted to extend into the grooves of the annulus and form a labyrinth packing with the walls of the grooves in said annulus.

3. In combination, a shaft, an annulus fixed upon the shaft having a plurality of spaced concentric packing grooves in the outer face thereof, a casing about the annulus and protruding outwardly therefrom, a cap threaded upon the outer end of the casing, and cylindrical packing members with annular ridges upon the inner and outer surfaces thereof, removably secured to the cap, and adapted to be inserted within the concentric grooves in the annulus.

4. In combination, a shaft, an annulus fixed upon the shaft having a plurality of spaced concentric packing grooves in the outer face thereof, a casing about the annulus and extending forwardly therefrom, a cap threaded upon the outer end of the casing, said cap being free for adjustment with respect to the outer end of said annulus, an annulus block carried by said cap having concentric grooves in its inner face in alignment with the grooves in said annulus, and a plurality of cylindrical packing members each having an end secured in a groove of the annulus block carried by said cap and its other end extended into the corresponding grooves in the annulus upon said shaft, said cylindrical packing members each having its outer and inner surfaces provided with annular ridges.

5. In combination, a shaft, an annulus fixed upon the shaft having a plurality of concentrically spaced packing grooves in the outer face thereof, a casing about the annulus and extending outwardly therefrom, a cap threaded upon the outer end of the casing adapted to be free for adjustment with respect to the associated end of the annulus, an annular block secured to the inner face of the cap having a plurality of concentric grooves in its inner face, each groove in the annular member being in alignment with a groove in said annulus, and packing members carried by the annular member, each packing member comprising a plurality of arcuate sections each having one end removably secured within a groove of said annular member and its other end extending into the associated groove of the annulus, the last named ends of said packing member being provided with annular ribs upon the outer and inner faces thereof.

Signed at Washington, District of Columbia, this 4th day of May, 1925.

GUYSBERT B. VROOM.